May 26, 1942.    H. N. RIDGWAY    2,283,948
AUTOMOBILE TRACTION DEVICE
Filed April 9, 1941    4 Sheets-Sheet 1
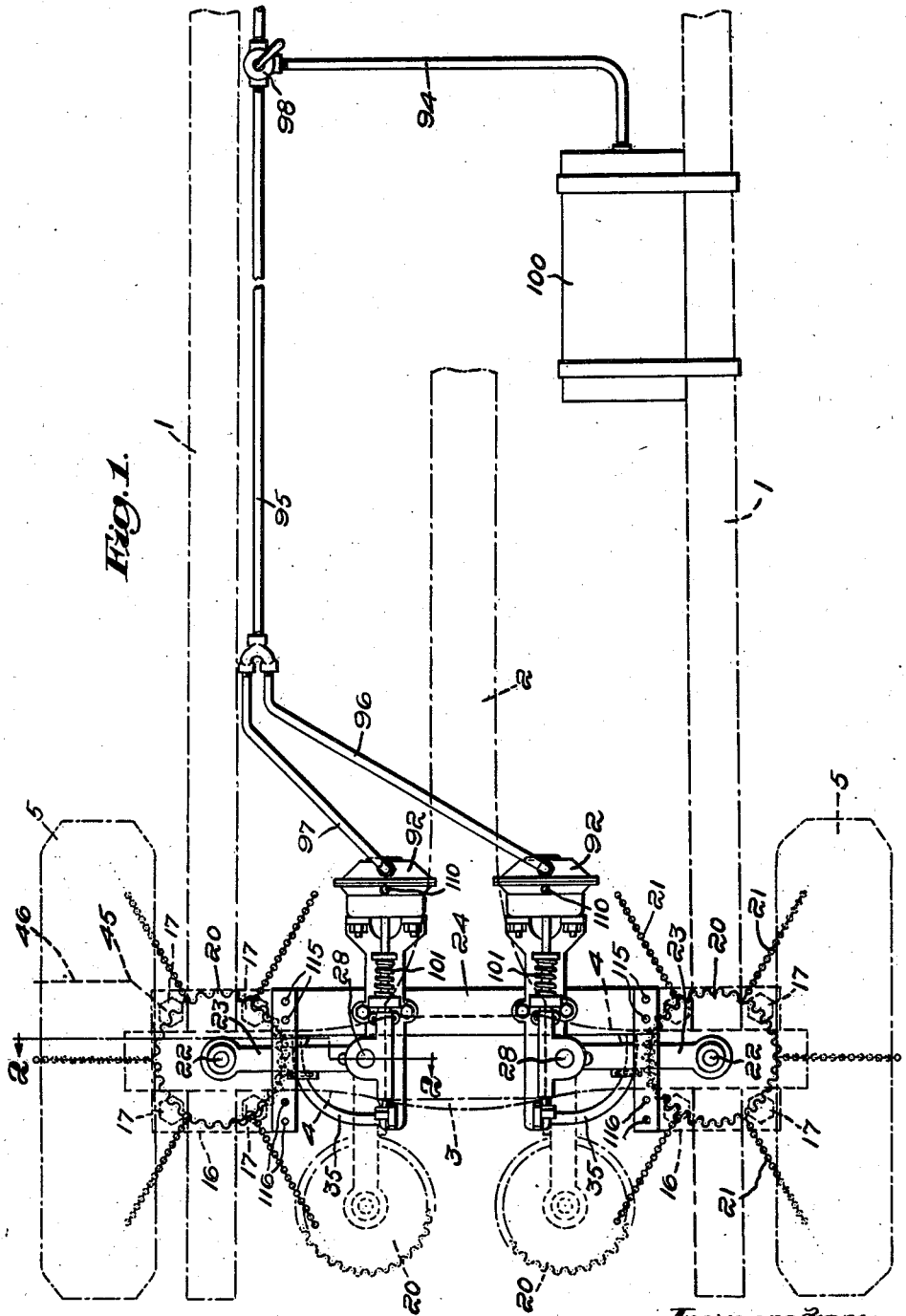

May 26, 1942.  H. N. RIDGWAY  2,283,948
AUTOMOBILE TRACTION DEVICE
Filed April 9, 1941   4 Sheets-Sheet 2
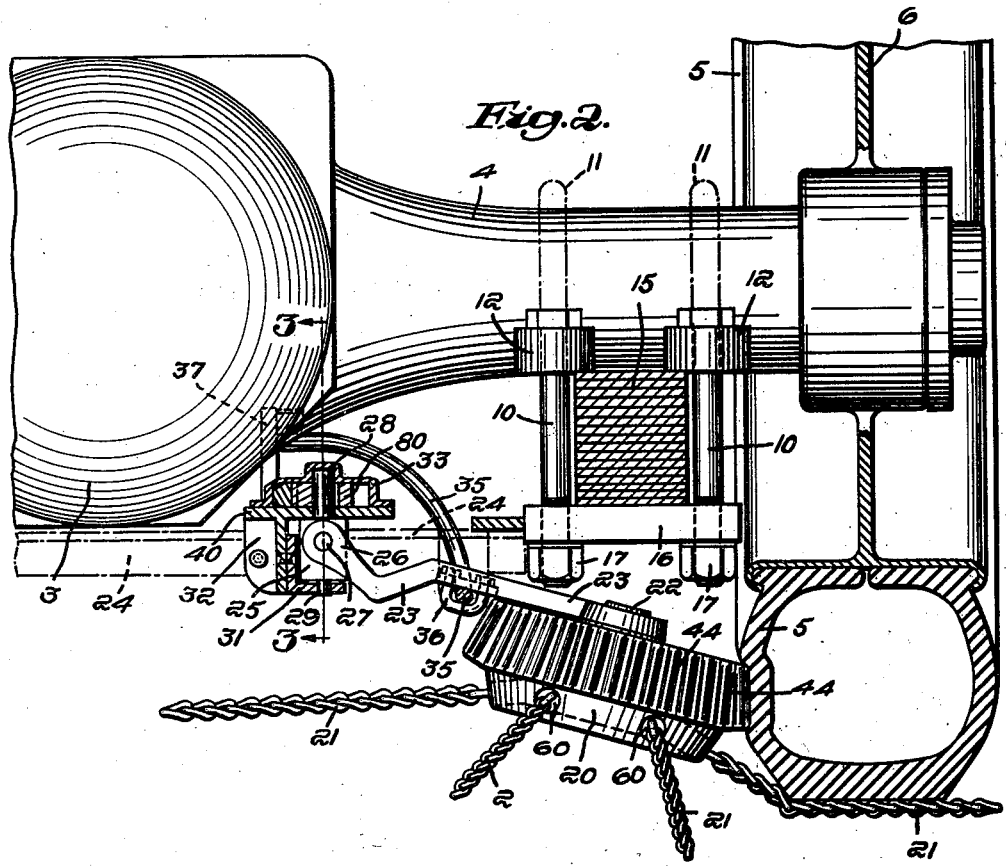
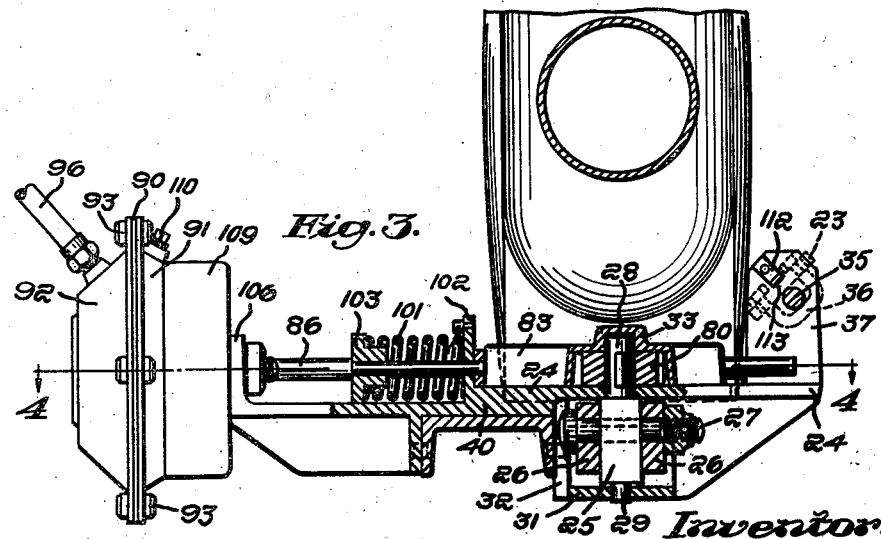
Inventor:
Herbert N. Ridgway
by James R. Hodder
Attorney

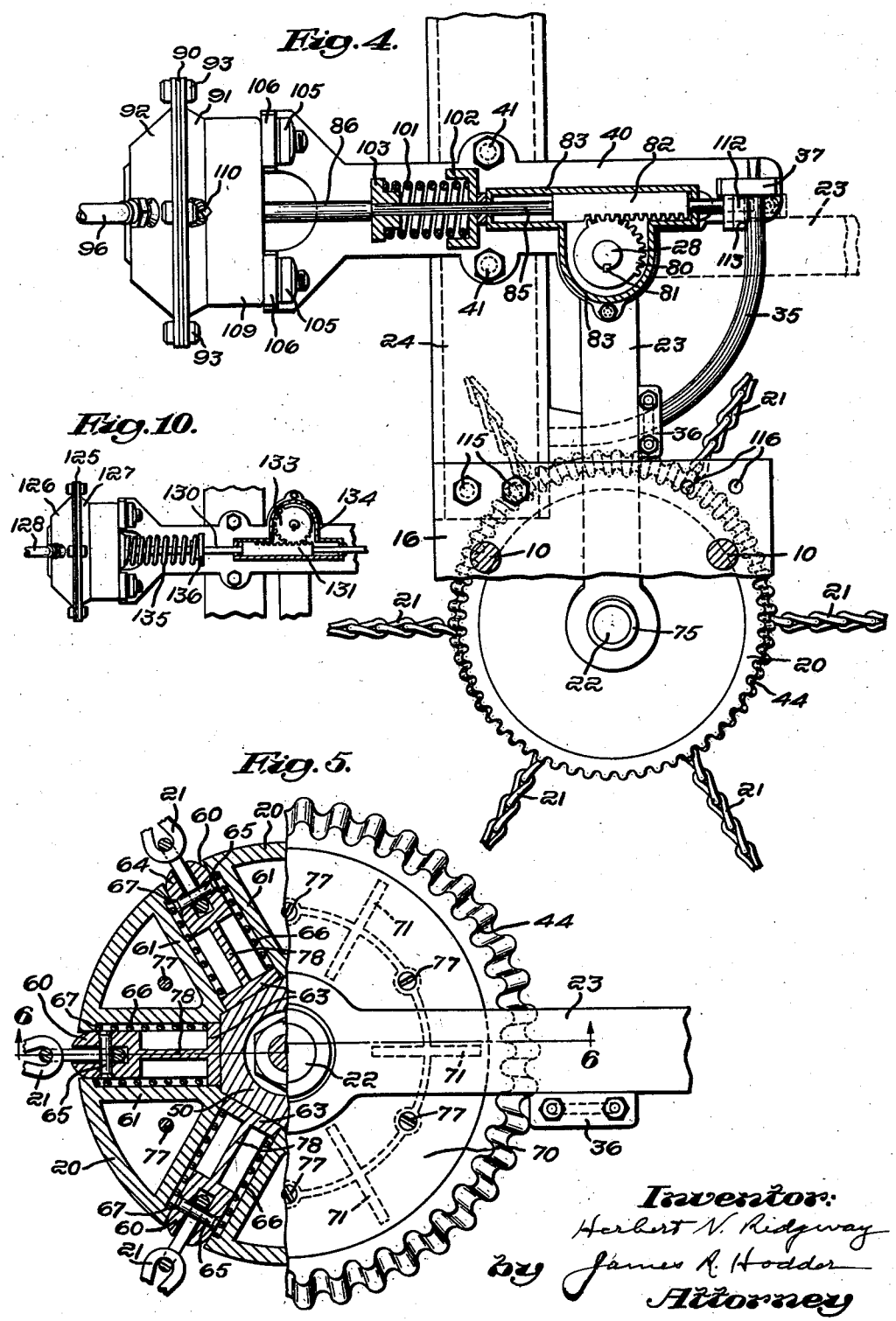

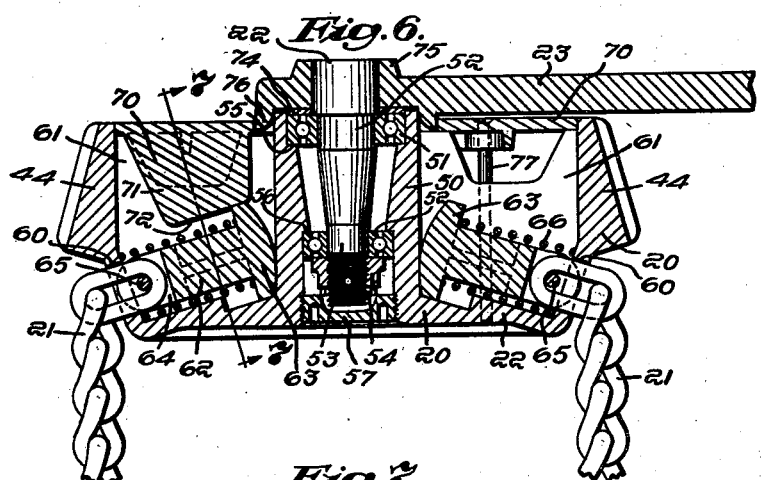
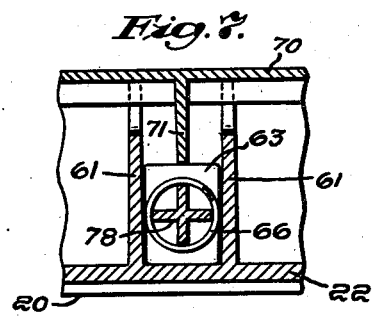
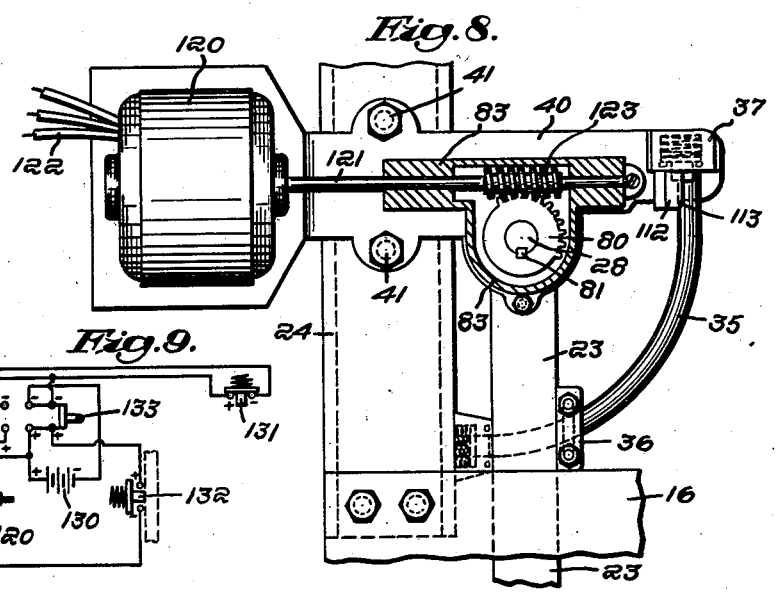

Patented May 26, 1942

2,283,948

UNITED STATES PATENT OFFICE 2,283,948

AUTOMOBILE TRACTION DEVICE

Herbert N. Ridgway, Winthrop, Mass.

Application April 9, 1941, Serial No. 387,647

14 Claims. (Cl. 188—4)

My present invention is a novel and improved traction device for use in connection with motor vehicles, and is a development of and an improvement on the invention shown and described in my prior application Ser. No. 316,885, filed February 2, 1940, now Patent No. 2,241,923, issued May 13, 1941.

In my development of traction devices of this character, I have devised a movable carrier adapted to be swung into and out of operative position, as desired, which carrier would have a plurality of traction chains, or the like, adapted to be swung underneath the vehicle tire by centrifugal force, such centrifugal force being preferably caused by rotatable means in contact with the sides of a tire adjacent which the device is mounted and receiving rotation from said contact as the vehicle wheel and tire are rotated. Such traction devices would be arranged in pairs so as to insure the traction on each wheel of a pair where an axle with differential was employed.

In my said prior application, I illustrated devices operable by the driver of a vehicle to throw the traction devices into operative or inoperative position by mechanical means; and in the present application I have illustrated power-actuated means for this purpose also controlled by the driver so that the traction devices would be thrown into action when desired and withdrawn therefrom without the driver leaving his driving position.

Such power-actuated means are entirely automatic and may be effective by utilizing compressed air, an electric motor or vacuum-creating devices. For passenger cars, I would prefer to use an electric motor or vacuum means; while for heavier vehicles such as busses, trucks, and the like I would employ an electric motor, hydraulic, or air compression means.

Important features in the present invention consist of a unit construction quickly attachable to and detachable from a vehicle, the provision of a universal joint for the arm, for moving the rotatable carrier into and out of operative position, improved construction on the traction members, and connections therewith in the carrier, a guiding quadrant controlling the movement of the rotatable carrier, the reversible capacity of the unit, and the several power-actuating mechanisms therefor.

Referring to the drawings,

Fig. 1 is a diagrammatic plan view of my power-actuated traction device applied to the rear axles of a motor vehicle shown in diagrammatic form, looking from the bottom upward;

Fig. 2 is an enlarged side elevational view partly in cross-section illustrating the traction device in operative position;

Fig. 3 is an enlarged view on the line 3—3 of Fig. 2;

Fig. 4 is an enlarged view on the line 4—4 of Fig. 3;

Fig. 5 is an enlarged plan view partly in cross-section of a carrier and the interior construction;

Fig. 6 is a cross-sectional view on the line 6—6 of Fig. 5;

Fig. 7 is a cross-sectional view on the line 7—7 of Fig. 6;

Fig. 8 is an enlarged detail view illustrating a reversible motor as the power-actuating means to throw the carrier and traction device into and out of operative position;

Fig. 9 is a diagrammatic view of the wiring circuit for the showing of Fig. 8, and Fig. 10 is a fragmentary detailed view illustrating in modified form vacuum-actuating mechanism in place of the power actuation of the main figures.

Referring to Fig. 1, I have shown in dotted lines a pair of side frames 1, 1, a central housing 2 for the drive shaft, differential housing 3, and axle housing 4—4, together with a pair of tires 5—5, all shown in dotted lines for the sake of clearness in this figure. Each tire 5 is mounted on a suitable wheel 6, see Fig. 2.

In my said prior application, Ser. No. 316,885, now Patent No. 2,241,923, I have illustrated the movable carrier as mounted to the axle to which the same is attached at the forward side relatively with the forward line of travel of the vehicle so that the rotatable carrier and its attached traction chains are thrown downwardly and forwardly under the advance tread of the wheel adjacent which it operates. This is preferable, but in order to retract the carrier and chains when mounted forwardly of the axle, it is necessary to stop the vehicle and back up slightly in order to release whatever chain may be under the wheel.

This feature and advantage is fully explained in my said prior application and is the normal way in which my device would ordinarily be mounted on the rear axle. However, I believe that it is possible to also mount the rotatable carrier at the rear of the normal line of travel of the vehicle and, hence, to swing in the rotatable carrier for operative contact with the vehicle wheel tire from the rear, the rotative action of the carrier and the centrifugal force of the chains striking against the tire being sufficient, it is believed, to be effective to give traction to the wheel even though the wheel is rotating to advance the vehicle and, hence, against the line of impact between the chain and the wheel tread. If this method is feasible, as I believe to be the case on ice, deep snow, and mud, for short distances, it is then possible to retract the carrier and chains without backing up the vehicle. By simply slowing down the speed of the wheels after the vehicle is on a firm tractive surface, it is possible to swing up the chains and carrier without stopping and backing. Accordingly, I have illustrated in the diagrammatic form of Fig. 1 such a mounting, and I provide means for readily reversing the entire unit from a rear mounting to a forward mounting on the axle, as will be explained.

My traction device is preferably assembled and mounted as an entire unit, with means to secure or clamp the same directly to each axle 4 adjacent the wheel and tire with which the traction device is intended to cooperate. Each unit is preferably operated by separate actuating mechanism so that each wheel and each traction member is separately engaged by the traction chains or other devices utilized, although both may be controlled by a single source of power and from the same control station in convenient reach of the driver.

Referring to Fig. 2, I may clamp the entire unit to the axle 4 by a pair of U-shaped bolts 10—10 which may be either extending around the axle, as shown in dotted lines at 11—11, Fig. 2, or may extend thru lugs 12—12 formed on the axle in spaced relation, preferably to allow for space or clearance of the usual vehicle spring 15. These clamping bolts 10, whether they go entirely around the axle as indicated at 11, or thru the lugs 12, are arranged with their lower ends to pass thru four openings in the plate 16, thru which openings the bolts 10 extend and, with threaded end portions, are arranged to receive nuts 17 to thus clamp the plate 16 rigidly and firmly in desired position on the axle 4.

The rotatable carrier 20, to which are yieldingly secured a plurality of traction chains 21, as will be further described, is mounted on a shaft 22 at the outer end of an arm 23, which arm has its inner end connected by a universal joint construction to a cross-bar 24 secured to the plate 16.

This universal joint construction may be of any suitable form but, as herein shown, comprises a vertical pivoted shaft 25 about which forked ends 26—26 of the arm 23 are fitted, thru which a bolt 27 passes. The pivot 25 has upper and lower trunnions 28 and 29, respectively (see Figs. 2 and 3), the upper engaging in a bearing in a cover 33 and the lower trunnion fitting in a plate 31 extending from a bracket 32 attached to the cross-bar 24. The cover 33 is secured to the plate 40 and protects this universal joint construction. This feature is of great importance as it enables the rotatable carrier 20 to automatically and yieldingly fit upon and interlock with the tire while the rotating carrier is in operative position.

I prefer to move the rotatable carrier 20 into and out of operative position by controlling the movement on an arc, and for this purpose I provide a quadrant 35 on which the arm 23 will slide or ride, thus positively controlling the downward movement of the carrier 20 when moved into operative engagement with the tire 5, and, similarly controlling its upward and lifting action when moved to inoperative position remote from engagement with the tire, thus lifting the rotating carrier and its traction chains 21 upward and out of the way. The quadrant 35, for this purpose, is arranged to pass underneath the arm 23, being engaged by a U-shaped bolt 36 attached to the arm 23 (see Figs. 2 and 4), one end of the quadrant 35 being rigidly secured to the cross-bar 24, and the other end being also rigidly secured to an upstanding lug 37 on the outer end of a plate 40, which plate is secured to the cross bar 24 by bolts 41—41, see Fig. 4.

The rotatable carrier 20 is provided with a circumferential series of fluted grooves 44 preferably formed or cast directly in the outer surface of the carrier and adapted to impinge against the side wall of the tire 5 to insure a firm, interlocking, non-slipping and driving action between the rotatable tire 5 and the rotatable carrier 20. As soon as the carrier is moved downwardly and into operative and engaging position with the tire, the fluted surface 44 will rotate the carrier at the speed imparted to it by the rotating tire and, thus, rotate the entire carrier on its axle 22 and, hence, throwing out the chains 21 by centrifugal force, moving each chain 21 successively and independently to and under the tread of the tire 5, as will be readily understood and as fully explained in my said prior application, thus giving traction to the wheel.

Such chains 21, as they are thrown out, would strike the edge of the tire in advance or approximately at a point as indicated at 45, Fig. 1, and the chain would then be thrown crosswise, as indicated in dotted lines at 46, Fig. 1, thus positively positioning each chain 21 widthwise of the tire 5 in best traction position as graphically illustrated in Fig. 2. The yielding connection between each chain 21 and the carrier 20 permits the continued rotation of the carrier without undue strain, as the wheel 5 passes over the traction chain 21 engaged by it at the point of contact between the bottom of the wheel and roadway or surface over which the vehicle is passing.

While I find that the fluted form 44 is most beneficial and will eliminate all danger of injury, damage, or cutting of the tire 5, while insuring a non-slipping driving connection between the rotary carrier 20 and the tire, any similar anti-slipping means may, of course, be utilized as an equivalent construction.

The interior construction of the rotatable carrier 20 will now be described, as best shown in Fig. 6. The carrier 20 is preferably formed as a shell with an inner hub 50 adapted to receive suitable ball-bearing raceways 51 and 51 for rotatable engagement of the entire carrier on the axle 22, the raceways and carrier being assembled on the axle 22, suitably reduced portions 52 and 53 being formed on the axle 22 to receive these raceways. The lower end of the axle 22 is threaded to receive a nut 54, which thus locks the ball-bearing raceways 51 and 52 in assembled position on the axle and hub 50, shoulders 55 and 56 being formed on the hub 50 for this interlocking purpose. A cap 57 is also threaded into the central part of the hub 50 to close this recess and maintain the same in grease- and dustproof condition.

The rotatable carrier 20 is provided with a plurality of radial channels 60 formed with a pair of side walls 61 adjacent each channel to receive a sliding plug 62, having a square cross-head 63 at its inner end and a bifurcated portion 64 at the opposite or outer end thru which a bolt 65 passes to engage the innermost link in the traction chain 21.

A stop 68 in the form of a shoulder, formed on the lower portion of the bottom part of the carrier 20 (see Fig. 6) is provided to limit the outward movement of the plug 62. A cover 70 is arranged to fit between the top of the hub 50 and the outer rim carrying the fluted surface 44, which constitutes a protecting cover and also, preferably, is formed with a series of depending webs 71, each in alignment to engage and hold the respective plugs 62 in position.

For this purpose, I prefer to make the lower surface of each web 71 formed on an angle 72 to correspond with the opposite surface of the bottom portion of the carrier, as best shown in Figs. 6 and 7. Side partitions 61, 61, preferably cast integral with the carrier 2, complete the guides for the sliding of the plug. The cover 70 may be, and preferably is, formed flush with the top of the fluted rim 44 and rests on top of the series of partitions 61, 61, which are formed sufficiently short in height for this purpose.

I also prefer to add a washer 74 at the top of the hub 50, which, together with the bottom cap 57, encloses the ballbearings around the axle 22 in a dustproof condition and also retain the lubricant therein. The axle 22 may be keyed or otherwise rigidly secured to the end of the arm 23. Preferably I provide a driving fit at this point and spot-weld same at a series of points between the top of the axle 22 and the hub 75 on the end of the arm, thus providing a rigid construction.

A depending lip 76 (see Fig. 6) will serve to keep water, snow, and dust from working up around the top ballbearing 51. Threaded bolts 77 serve to hold the cover 70 in position by extending the same from the top thru the carrier and into tapped recesses in the bottom, or riveted.

For lightness, I prefer to form the intermediate portion of each of the plugs 62 as a cross-web 78, see Fig. 7, thus insuring lightness as well as sufficient strength between the inner cross-head portion 63 and the outer link-engaging portion 64.

In order to operate the arm 23 and swing the same from its inoperative position on the universal joint construction as a pivot so that the outer fluted rim 44 will impinge against the walls of the tire 5, I may utilize any suitable means. Preferably, however, I employ a novel type of operating construction actuating the arm 23 by a gear and rack arrangement mounted directly on the upper pinion 28 of the block 25, constituting a part of the universal joint structure 6. For this purpose I secure a gear wheel 80 to the pinion 28 by a key 81. Said gear wheel 80 need only have a segmental set of teeth as the line of movement of the arm 23 would ordinarily not extend 90°. Engaging the teeth on the gear 80 is a rack bar 82 mounted for reciprocation in a slide 83, which slide is secured to the plate 40.

A shaft 85 has a larger section 86 extending to a diaphragm 90 bolted between flanges on adjacent casings 91 and 92, a series of bolts 93 around the flange of said casings holding the diaphragm in position. Movement of this diaphragm 90 actuates the rack bar 82 to thus rock the arm 23 into and away from contact with the wheel 5, sliding the arm 23 on the rod 35.

Preferably I arrange power-actuated means, such for example as compressed air from a tank 100 thru conduits 94, 95, 96, and 97, as diagrammatically illustrated in Fig. 1, with a control valve 98 fitted at a suitable point, which admit pressure in the casing 92 against the diaphragm 90 and thus slides the shaft 86 and rack bar 82 outwardly, thereby swinging the arm 23 and its attached rotatable carrier 22 downwardly into operative position, in the full-line position shown in Figs. 1 and 2, and in dotted-line position shown in Fig. 4.

To retract the arm and carrier, I prefer to utilize a spring 101 grounded between a cap-shaped bar 102 encircling the smaller diameter 85 on the hub operating the rack bar, and with a hub 103 also mounted on the portion 85 and abutting against a shoulder on the main shaft 86, thus giving a compressing bearing for the spring 101, which will also thus act to retract the carrier 20 when the pressure is released, as will be readily appreciated.

I prefer to mount this entire operative device on the plate 40, securing the diaphragm and its enclosing casing by bolts 105—105 to flanges 106—106 at the end of the plate 40, as best shown in Fig. 4. I have also illustrated in this Fig. 4, an opening 110, to which a conduit from a vacuum-creating means could be attached and the pressure elements from the tank 40 would then be disconnected. In this manner the vacuum-creating means could be utilized to operate the diaphragm 90 and effect a reciprocation of the slide 82 and, hence, a rocking of the arm and carrier. However, owing to the difficulty of having a vacuum-tight packing in the box 109 thru which the rod or piston 86 passes, I prefer to utilize a separate vacuum-creating structure, as shown diagrammatically in Fig. 10.

To facilitate holding the arm 23 and its attached carrier and chains in inoperative position and prevent "chattering" and wear, I provide a block 112 with a wedge face 113 on the upstanding lug 37 so that as the arm 23 is swung into inoperative position by the action of the spring 101, it will wedge or jam between the plug 113 and the surface of the rod 35 (see dotted line position of 23, Fig. 4 and in Fig. 3) and thus hold the same firmly and tightly. The adjacent surface of the rod 35 may be flattened to facilitate this operation and said arm is preferably substantially at a tangent adjacent the block 112, as illustrated in Fig. 8, the frictional engagement of the block 112 between the bevelled face 113 and the rod 35 holding these contacting parts in wedged position under the action of the spring 101.

The plate 40 with associated parts, as just described, is mounted by bolts 41 on the cross 24 as above explained and this cross-bar carrying the pair of diaphragms, universal joint, and operating connections with the arms 23 and each its respective carrier 20, are thus assembled as a unit on the cross-bar 24. This cross-bar may be reversed from the position shown in Fig. 1, with the carriers adapted to swing in from the rear of the axle to wheel-engaging operative position by reversing the cross-bar 24 to the rear of the axle which thereby swings each carrier 20 into and under the forward part of the tires 5—5.

For this purpose I secure the cross-bar 24 to bolts 115 on the plate 6 so that a loosening of these bolts and a reversal of the parts and cross bar 24 to the rear of the axle, securing same to the plates 24 at 116—116, will thus reverse the entire operating mechanism readily and easily. When thus reversed, each carrier 20 would, of course, rotate in the same direction when in engagement with its respective tire 5 but the traction chains 21 would be thrown under the tires from a forward position instead of from the rear, as illustrated in full lines, Fig. 1.

Referring to Fig. 8, I have illustrated a modified form of construction work. A reversible electric motor 120 is provided with its armature 121 extending thru the guideway 83, and having formed thereon a worm 121 adapted to mesh with the segmental teeth on the gear wheel 80. Thus, this motor, when energized in one direction, will move the arm 23 and its attached carrier 20 into operative contact with the tire 5 of the wheel adjacent thereto; whereupon power being cut off the motor, it will thus automatically lock and hold the arm and carrier in operative position. Reversal of current in the motor 120 will remove the arm and carrier into inoperative position, where current is again automatically cut off. Current-conducting wires to a suitable source of power are illustrated at 122 and a wiring diagram to carry out such reversal is shown in Fig. 9.

As above explained, I may utilize manual operating means to swing the carrier in or out of operative position, or may utilize hydraulic means, compressed air, or a vacuum from any appropriate source of power.

For smaller automobiles, such as passenger cars, I would probably equip the same to utilize vacuum to operate the shaft 86 and, hence, the slide 82 and segmental gear 80 on the universal joint, as above explained. Such a vacuum-operated means attached thru a port 110, while possibly feasible, might be difficult to operate because of the packing thru which the shaft 86 would necessarily pass and any leakage there would, of course, damage the efficiency of the vacuum to operate on the diaphragm 90.

Therefore, I prefer to form the vacuum-operated means with an operating shaft on the opposite side of the universal joint gear to actuate the same by a pulling operation as distinguished from the pushing or thrusting of the diaphragm 80 when pressure is applied. Fig. 10 illustrates a preferred form of the vacuum-operated means, wherein a diaphragm 125 is clamped between casings 126 and 127 and a conduit 128 leading to the vacuum-creating means, such for example as to a suitable valve in the intake manifold, or otherwise, when thrown into operation exhausts the air from the side of the diaphragm 125 in the casing 126. The diaphragm or a piston operated thereby is attached to a shaft 130, which extends to a rack 131 operating in the segmental teeth 133 on the pinion 28 of the universal joint, only the teeth 133 are arranged diametrically opposite to the teeth 80, shown in the prior construction.

Thus, when the diaphragm is deflated, moving to the left viewed in Fig. 10, the shaft 130 and rack 131 engage the teeth 133 and move the arm 23 and carrier 20 in the same rotative direction, as that shown in Fig. 4 when the shaft 86 is initially moved by the pressure-applying means on the diaphragm 90. A casing 134 holds the rack 131 and teeth 133 in mesh and also constitutes a bearing for the shaft 130. Also, in this form as shown in Fig. 10, I provide a spring 135 to operate in the reverse manner from the spring 101 in the construction of Fig. 4 to retract the shaft 130 and swing the arm and carrier from operative to inoperative position. For this purpose I weld, pin, or otherwise secure a hub 136 to the shaft 130 against which the spring 135 bears and with its opposite end bearing on the casing to which the diaphragm 125 is secured.

I have shown and illustrated the use of a diaphragm either 90 or 125 since the reciprocating movement of the rack 82 or 131 is very slight and, therefore, well within the practical limits of a movable diaphragm although I may, if desired, utilize a piston operating in the casing to actuate the shafts 86 or 130, as will be readily appreciated.

Referring to Fig. 9, illustrating a wiring diagram for the reversible motor 120, I have illustrated a suitable source of power at 130 and a pair of limit switches 131 and 132 which are designed to break the circuit as the shaft 121 completes the limit of this rotation either to throw the arm 23 and attached carrier 20 into tire-engaging contact or to move the same in to inoperative position where the arm 23 is wedged in under the block 12, and rests on the adjacent flat part of the guide-rod 35. A switch 133 would be positioned within convenient reach of the operator to actuate the motor 120 for operation in either direction. The plus signs following the wiring shows the current flow from one direction of rotation; and the minus signs are indicative of the current flow thru the motor 120 for the reverse rotation. This wiring diagram is for illustrative purposes only and, of course, can be varied as desired.

In operation, with the unit clamped to the rear axle in proper position and alignment so that the combined length of the arm 23 and one-half diameter of the rotatable carrier 20 will exceed slightly the distance from the universal joint to the side walls of the tire 5 to insure indenting of the fluted rim 44 of the carrier against the tire wall to prevent slipping and hence eliminate danger of injury of the tire during operation, the arm 23 would normally be in retracted position. This retracted position is shown at the right, Fig. 4, with the arm 23 resting on a straight and, preferably, sliding flattened part of the guide-rod 35 between the wedge surface 115 on the rack 112 which thus holds the arm against chattering while inoperative.

On desiring to throw the traction chains 21 into operative position, the driver of the vehicle would either actuate the valve 98, which would be in convenient position or reach to throw pressure into the casings 92 and, hence, against the diaphragm 90, which, thereupon moves the shaft 86 and attached portion to the right, viewing Figs. 3 and 4, thereby rocking the arm 23 thru engagement of the rack 82 and gear 80. Thus, the arm is swung downwardly with the fluted surface 44 into interlocking and friction action, driving against the side walls of the tire 5. Thereupon, rotation of the tires 5 will similarly rotate the carriers 20, throwing out the chains 21 by centrifugal force, which are thus positively and forcibly thrown under the tread of the tire 5 to give traction between the tire and the surface on which the same rests.

To retract the carrier, it may be necessary to stop the vehicle to release whatever chain 21 may be underneath the same and even to go ahead slightly or back up therefor, such slight movement not being sufficient to exert any centrifugal force on the chains 21; whereupon, with the chain or chains 21 thus released, the driver can move the valve handle 98, releasing the pressure against the diaphragm 90 and the springs 101 will retract each carrier, swinging it upwardly and to inoperative position. Where an electric motor is used, the switch 133 is similarly operated to move the carrier into or out of operative position, as will be readily understood.

When the vacuum-creating means is utilized, if the same operates on the diaphragm 90 from the conduit coupled to the opening 110, the shaft 86 would, of course, be moved in identically the same manner as that when utilizing pressure thru the conduit 96. However, as above explained, it is extremely difficult to have a vacuum-tight packing around the shaft 86 without using up power needlessly to reciprocate the same and, therefore, I prefer to employ a vacuum-creating means as shown in Fig. 10.

In this case, the pull exerted by the vacuum-creating means is opposite to the pushing or thrust of the pressure-creating means thru a conduit 96 and, therefore, I change the gear 80 on the pinion 28 of the universal joint automatically opposite to that as shown in Fig. 8, so that the vacuum thrust will pull the shaft to throw the arm 23 and carrier 20 into operative position, as will be readily understood on reference to Fig. 10.

I claim:

1. Traction apparatus of the kind described for motor vehicles, comprising a pair of movable carriers, each carrier being rotatably mounted on one end of a movable arm, said arm having its opposite end secured to a universal joint, each carrier having a fluted rim to engage the tire of the vehicle wheel in contact with which said carrier is adapted to be moved, and a plurality of traction chains attached to said carrier and adapted to be thrown by centrifugal force under said tire upon contact of the rim of the carrier with said tire during rotation of the tire.

2. Traction apparatus of the kind described for motor vehicles, comprising a pair of movable carriers, each carrier being rotatably mounted on one end of a movable arm, said arm having its opposite end secured to a universal joint, each carrier having a fluted rim to engage the tire of the vehicle wheel in contact with which said carrier is adapted to be moved, and a plurality of traction chains attached to said carrier, and adapted to be thrown by centrifugal force under said tire upon contact of the rim of the carrier with said tire during rotation of the tire, and means within the control of the operator acting on said universal joint structure to move the arm and carrier into contact with said wheel.

3. Traction apparatus of the kind described for motor vehicles, comprising a pair of movable carriers, each carrier being rotatably mounted on one end of a movable arm, said arm having its opposite end secured to a universal joint, each carrier having a fluted rim to engage the tire of the vehicle wheel in contact with which said carrier is adapted to be moved, and a plurality of traction chains attached to said carrier and adapted to be thrown by centrifugal force under said tire upon contact of the rim of the carrier with said tire during rotation of the tire, in combination with means to positively move and to hold the arm and carrier in position for engagement of the fluted rim of the carrier on said wheel, and means to retract the carrier therefrom, both of said last-mentioned means being under control of the driver of the vehicle.

4. Traction apparatus for motor vehicles comprising a unit adapted to be clamped to the rear axle of the vehicle, said unit including a pair of movable arms, each having a rotatable carrier mounted on the other end of the arm and adapted to be swung into engagement with the tire of the vehicle adjacent which said arm is secured, a universal joint for each arm, and power-actuated means for moving each arm independently of the other into position with each carrier in contact with the vehicle tire, both said actuating means being simultaneously operated by the driver.

5. Traction apparatus for motor vehicles comprising a unit adapted to be clamped to the rear axle of the vehicle, said unit including a pair of movable arms, each having a rotatable carrier mounted on the other end of the arm and adapted to be swung into engagement with the tire of the vehicle adjacent which said arm is secured, a universal joint for each arm, and power-actuated means for moving each arm independently of the other into position with each carrier in contact with the vehicle tire, both said actuating means being simultaneously operated by the driver, in combination with yielding means to retract the arm and carrier from said vehicle tire-contact, operating automatically upon release of the power-actuated means.

6. Traction apparatus for motor vehicles comprising a unit adapted to be clamped to the rear axle of the vehicle, said unit including a pair of movable arms, each having a rotatable carrier mounted on the other end of the arm and adapted to be swung into engagement with the tire of the vehicle adjacent which said arm is secured, a universal joint for each arm, and power-actuated means for moving each arm independently of the other into position with each carrier in contact with the vehicle tire, said unit and its attached arm, carrier, and power-actuated means therefor adapted to be reversible on the tire, whereby each carrier may be swung from forwardly of the axle into tire-engaging position, each carrier having a plurality of traction devices operable to be thrown by centrifugal force underneath the traction portion of the wheel and tires.

7. In traction apparatus of the kind described, a universal joint mounting including a movable arm, said arm having at its free end a rotatable carrier, a plurality of traction chains yieldingly secured to said carrier, means to move the carrier into and away from contact with the vehicle tires, and a quadrant controlling the path of movement of said carrier to operative and inoperative position.

8. In traction apparatus of the kind described, a universal joint mounting including a movable arm, said arm having at its free end a rotatable carrier, a plurality of traction chains yieldingly secured to said carrier, and a reversible electric motor adapted to move the arm and carrier into operative or inoperative position by control of the operator.

9. In traction apparatus of the kind described, a universal joint having an extending arm, a traction carrier rotatably mounted on the said arm said carrier being constructed and arranged to be rotated by contact with the wheel of a vehicle, and means to move a member of said universal joint to move said arm and carrier into and out of operative position.

10. In traction apparatus of the kind described, a universal joint mounting including a movable arm, said arm having at its free end a rotatable carrier, a plurality of traction chains yieldingly secured to said carrier, and fluid-operated means to move the arm and carrier into operative or inoperative position at will of the driver.

11. Traction apparatus of the kind described adapted to be clamped to a motor vehicle axle adjacent a wheel and tire, a movable arm having one end secured to a universal joint adjacent said axle and at the other end of said arm to a rotatable carrier, the length of the arm and the diameter of the carrier being sufficient to move the rim of the carrier into tire-indenting position, the tire-engaging portion of said carrier being fluted to present a non-slipping, interlocking, frictional engagement between said rim and tire, whereby rotation of the wheel and tire will rotate the carrier without any substantial non-slipping relationship with said carrier, and a plurality of traction chains secured to the carrier and adapted to be thrown under the tire by the carrier-rotating action.

12. In traction apparatus of the kind described, a universal joint having an extending arm, a rotatable carrier on the outer end of said arm said carrier being constructed and arranged to be rotated by contact with the wheel of a vehicle, traction means actuated by rotation of said carrier to be positively moved under a vehicle wheel, and vacuum-operating means acting on a part of said universal joint structure to move said arm and carrier into operative position.

13. In traction apparatus of the kind described, a universal joint having an extending arm, a rotatable carrier on the outer end of said arm said carrier being constructed and arranged to be rotated by contact with the wheel of a vehicle, traction means actuated by rotation of said carrier to be positively moved under a vehicle wheel, and pressure-operating means acting on a part of said universal joint structure to move said arm and carrier into operative position.

14. In traction apparatus of the kind described, a universal joint having an extending arm, a rotatable carrier on the outer end of said arm, traction means actuated by rotation of said carrier to be positively moved under a vehicle wheel, and electric-operated means acting on a part of said universal joint structure to move said arm and carrier into operative position.

HERBERT N. RIDGWAY.